(12) United States Patent
Kim et al.

(10) Patent No.: US 7,799,989 B2
(45) Date of Patent: Sep. 21, 2010

(54) PHOTO-ELECTRIC FOR A DYE-SENSITIZED SOLAR CELL COMPRISING A MESO-POROUS METAL OXIDE THIN FILM AND A PROCESS FOR PREPARATION THEREOF

(75) Inventors: Kyung Kon Kim, Seoul (KR); Nam-Gyu Park, Seoul (KR); Ki Cheon Yoo, Seoul (KR); Wan In Lee, Seoul (KR); Yun Hee Lee, Incheon (KR)

(73) Assignee: Korea Institute of Science and Technology, Seoul (KR)

( * ) Notice: Subject to any disclaimer, the term of this patent is extended or adjusted under 35 U.S.C. 154(b) by 395 days.

(21) Appl. No.: 11/966,048

(22) Filed: Dec. 28, 2007

(65) Prior Publication Data

US 2008/0185037 A1    Aug. 7, 2008

(30) Foreign Application Priority Data

Jan. 4, 2007    (KR) .................... 10-2007-0000967

(51) Int. Cl.
*H01G 9/048* (2006.01)
*H01G 9/20* (2006.01)

(52) U.S. Cl. .............. 136/256; 136/263; 136/264; 136/252; 438/85; 438/82; 438/57

(58) Field of Classification Search .............. 136/252, 136/256, 263, 264; 438/85, 82, 57
See application file for complete search history.

(56) References Cited

U.S. PATENT DOCUMENTS

| 6,252,156 B1 * | 6/2001 | Ono et al. ................ 136/256 |
| 6,645,907 B2 * | 11/2003 | Muramatsu ................ 502/340 |
| 2006/0110618 A1 * | 5/2006 | Manivannan et al. ........ 428/566 |
| 2007/0209696 A1 * | 9/2007 | Duerr et al. ................ 136/252 |

* cited by examiner

*Primary Examiner*—Jennifer K Michener
*Assistant Examiner*—Jayne Mershon
(74) *Attorney, Agent, or Firm*—NSIP Law (57) ABSTRACT

Disclosed is a photo-electrode for a dye-sensitized solar cell comprising a conductive substrate; a meso-porous metal oxide thin film formed on the surface of the conductive substrate; a porous film formed on the meso-porous metal oxide thin film and comprising metal oxide nanoparticles; and a photosensitive dye adsorbed on the surface of the porous film; and a process for preparation thereof.

19 Claims, 5 Drawing Sheets

PHOTO-ELECTRIC FOR A DYE-SENSITIZED SOLAR CELL COMPRISING A MESO-POROUS METAL OXIDE THIN FILM AND A PROCESS FOR PREPARATION THEREOF

This is a Utility Application under 35 U.S.C. §1.111 which claims priority to Korean Patent Application No. 10-2007-0000967 filed Jan. 4, 2007.

FIELD OF THE INVENTION

The present invention relates to a photo-electrode for a dye-sensitized solar cell comprising a meso-porous metal oxide thin film for providing improved light transmittance, transition metal oxide layer-to-substrate adhesion and photo-electric conversion efficiency; and a process for preparation thereof.

BACKGROUND OF THE INVENTION

A dye-sensitized solar cell contains, as its critical components, photosensitive dye molecules for absorbing visible light and a transition metal oxide layer for transferring electrons generated by the dye molecules. A representative example of a dye-sensitized solar cell has been reported by Gratzel et al. of Switzerland, and it comprises titanium dioxide ($TiO_2$) nanoparticles, dye molecules adsorbed thereon, a semiconductor electrode, a platinum electrode, and an electrolytic solution interposed between the electrodes. This type of solar cell has the advantage of lower production cost than the conventional silicone solar cell.

In the preparation of a conventional dye-sensitized solar cell, a conductive substrate is directly coated with a colloidal solution of nanoparticular oxide and calcined at a temperature of 400 to 500° C. Although the calcination treatment is intended to remove the polymeric binder component of the colloidal solution and to improve the electrical contact between the nanoparticulated oxide layer and the substrate, even a slight physical impact thereon would often cause the detachment of the first conductive substrate and the nanoparticulated oxide layer.

Further, the conventional dye-sensitized solar cell has disadvantages in that the adhesion between the substrate and the nanoparticulated oxide layer is weak and that the transparency of the first conductive substrate is poor. Thus, the ability of transferring electrons generated by the dye molecules to the substrate is not efficient. Further, the passage of electrons through crystal boundaries of high electron density also hinders the electron transfer as well as light transmittance.

SUMMARY OF THE INVENTION

Accordingly, it is an object of the present invention to provide a photo-electrode for a dye-sensitized solar cell comprising a meso-porous metal oxide thin film for improving the light transmittance and the substrate-to-metal oxide film adhesion, to enhance the efficiencies of electron transfer and photoelectric conversion, and a process for preparation thereof.

It is another object of the present invention to provide a dye-sensitized solar cell comprising said photo-electrode.

In accordance with one aspect of the present invention, there is provided a photo-electrode for a dye-sensitized solar cell comprising a conductive substrate; a meso-porous metal oxide thin film formed on the surface of the conductive substrate; a porous film formed on the meso-porous metal oxide thin film and comprising metal oxide nanoparticles; and a photosensitive dye adsorbed on the surface of the porous film.

In accordance with another aspect of the present invention, there is provided a process for preparing a photo-electrode for a dye-sensitized solar cell comprising (a) preparing a conductive substrate; (b) forming a meso-porous thin film comprising metal oxides on the surface of the conductive substrate; (c) forming a porous film comprising metal oxide nanoparticles on the meso-porous thin film; and (d) making a photosensitive dye to adsorb on the surface of the porous film.

BRIEF DESCRIPTION OF THE DRAWINGS

The above and other objects and features of the present invention will become apparent from the following description of the invention, when taken in conjunction with the accompanying drawings, which respectively show.

DETAILED DESCRIPTION OF THE INVENTION

In accordance with the present invention, an alcoholic sol-gel solution containing a metal oxide precursor, a surfactant, and hydrochloric acid is first coated onto a first transparent conductive substrate to induce an aligned meso-structure, and the coated substrate is then subjected to heat treatment to form an aligned meso-porous metal oxide thin film, which increases the adhesion between the transparent conductive substrate and the porous nanoparticular oxide film. As a result, the photoelectric conversion efficiency of the dye-sensitized solar cell is improved. Preferably, the meso-porous metal oxide thin film may be a meso-porous titanium oxide thin film.

In case of a conventional photoelectrode, the porous semiconducting oxide is disposed on the first conductive substrate employing particles having an average particle diameter of 3 to 50 nm, and the electron transfer must take place through a number of crystal boundaries, which lowers the electron transfer efficiency. However, the meso-porous metal oxide thin film of the present invention allows electrons to be directly transferred through the meso-pores, without passing through the crystal boundaries, to the first conductive substrate, thereby facilitating the electron transfer and enhancing the electron transfer efficiency.

Further, the coating the first conductive substrate with a meso-porous metal oxide thin film improves the transparency of the first conductive substrate. That is, when an alcoholic sol-gel solution containing a metal oxide precursor, a surfactant, and hydrochloric acid is coated onto the first conductive substrate by spin coating, and the coated substrate is aged under a specified condition and calcined, the first conductive substrate becomes markedly more transparent.

The first conductive substrate may be obtained by coating a light transmissive glass substrate with a transparent conductive film such as fluorine-doped tin oxide (FTO). Although such first conductive substrate is transparent, the transparency thereof is lower than that of the glass substrate. However, the first conductive substrate having the meso-porous metal oxide coated thereon is more transparent than the original first conductive substrate. Hence, the first conductive substrate of the present invention has an improved light transmittance.

Hereinafter, the present invention will be described in more detail according to preferred embodiments with reference to the accompanying drawings.

The photo-electrode for a dye-sensitized solar cell according to the present invention comprises a conductive substrate; a meso-porous metal oxide thin film formed on the surface of the conductive substrate; a porous metal oxide nanoparticle layer formed on the meso-porous metal oxide thin film; and a photosensitive dye adsorbed on the surface of the porous film.

Figure 1A:
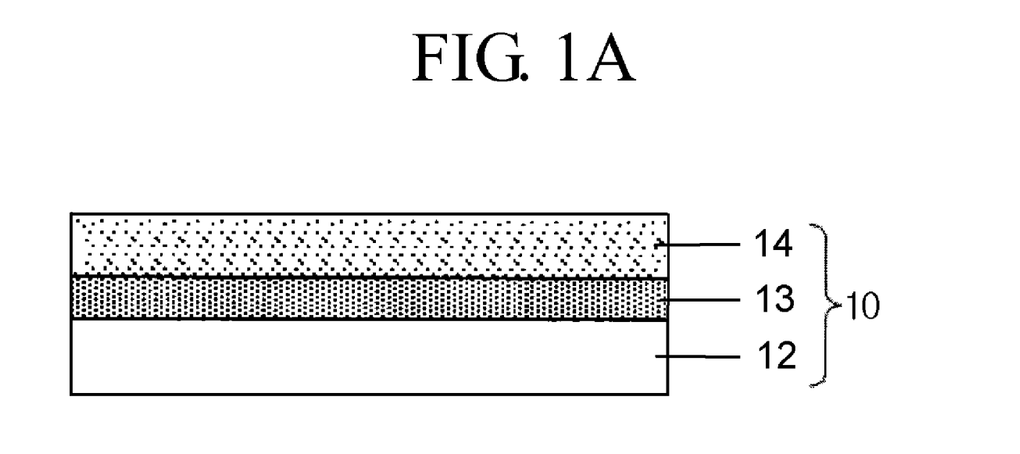
FIGS. 1A and 1B: cross sectional views of the inventive photo-electrode in accordance with two embodiments of the invention, respectively.
Figure 1B:
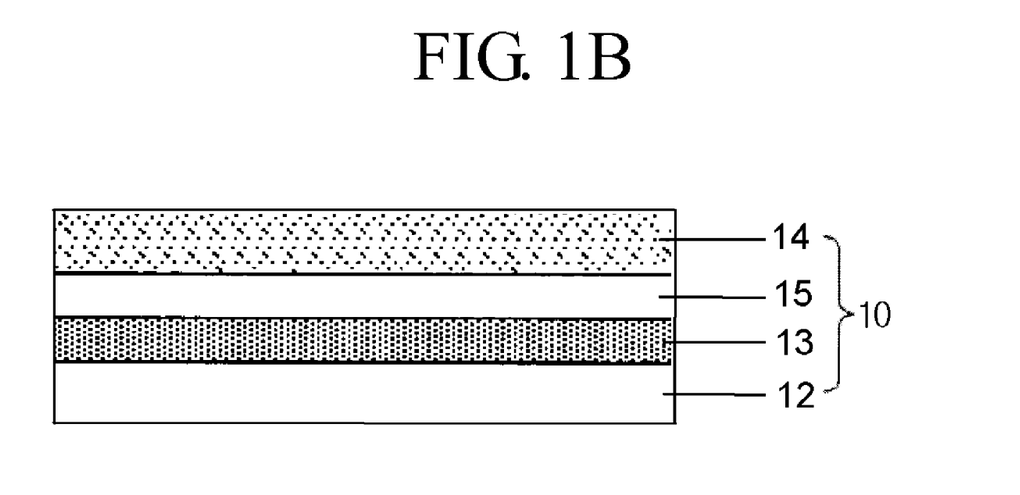

FIGS. 1A and 1B show cross sectional views of the inventive photo-electrodes comprising a meso-porous metal oxide thin film in accordance with two embodiments of the invention, respectively.

Referring to FIG. 1A, the photo-electrode comprises a first conductive substrate 12, a meso-porous metal oxide thin film 13, and a porous metal oxide film 14 are formed on the first conductive substrate in order. The inventive photo-electrode may further comprise a blocking layer 15 interposed between the meso-porous metal oxide thin film 13 and the porous metal oxide film 14, as shown in FIG. 1B.

Any of various conductive materials commonly available in the art may be used as the first conductive substrate 12. It is preferable to use any transparent plastic substrate or glass substrate selected from the group consisting of polyethylene terephthalate (PET), polyethylene naphthalate (PEN), polycarbonate (PC), polypropylene (PP), polyimide (PI) and triacetyl cellulose (TAC) on which any conductive film selected from the group consisting of indium tin oxide (ITO), fluorine tin oxide (FTO), $ZnO$—$Ga_2O_3$, $ZnO$—$Al_2O_3$ and $SnO_2$—$Sb_2O_3$ is coated, but not limited thereto.

The metal oxide of the meso-porous metal oxide thin film 13 may be selected from the group consisting of titanium (Ti) oxide, zirconium (Zr) oxide, strontium (Sr) oxide, zinc (Zn) oxide, indium (In) oxide, lanthanum (La) oxide, vanadium (V) oxide, molybdenum (Mo) oxide, tungsten (W) oxide, tin (Sn) oxide, niobium (Nb) oxide, magnesium (Mg) oxide, aluminum (Al) oxide, yttrium (Y) oxide, scandium (Sc) oxide, samarium (Sm) oxide, gallium (Ga) oxide, strontium-titanium (SrTi) oxide, and a mixture thereof.

Preferably, the meso-porous metal oxide thin film 13 may have an average thickness ranging from 1 to 5,000 nm, and more preferably 300 nm.

The porous metal oxide film 14 formed on the meso-porous metal oxide thin film 13 absorbs sunlight and functions as a catalyst (for redox reaction) and as an electrical conductor. The nanoparticles contained in the porous metal oxide film 14 may be the same as those contained in the meso-porous metal oxide thin film 13.

Preferably, the porous metal oxide film 14 has an average thickness ranging from 10 to 20 µm. Further, the particle size of the metal oxides contained in the porous metal oxide film may be determined based on its sunlight absorbance, catalytic activity (for redox reaction), and electrical conduction. Preferably, the average particle size thereof is in the range of 1 to 500 nm, more preferably 5 to 50 nm.

A photosensitive dye is adsorbed on the surface of the porous metal oxide film 14 for absorbing sunlight. The photosensitive dye that may be used in the present invention is preferably ruthenium (Ru) or a composite thereof. But any of the photosensitive dyes commonly available in the art capable of absorbing visible light may be used in the present invention. Preferred is a photo-sensitive dye capable of adsorbing metal oxide nanoparticles, conductive fine particulates and light-scatterers employed in the formation of the porous film, and also of exciting electrons by absorbed visible light.

The meso-porous metal oxide thin film acts as a blocking layer and improves light transmittance, but it also makes the undesirable direct contact between the transparent electrode (e.g., FTO) and the electrolyte possible via the permeation of the electrolyte through the meso-pores, to induce charge carrier recombination. Since such charge carrier recombination impairs the efficiency, a blocking layer as shown in FIG. 1B is preferably introduced on the meso-porous metal oxide thin film for preventing the direct contact between the transparent electrode and the electrolyte, to secure a high efficiency.

The blocking layer 15 that may be formed on the meso-porous metal oxide thin film 13 not only improves the adhesion between the meso-porous metal oxide thin film 13 and the porous film 14, but also prevents the direct contact between the substrate 12 and the electrolyte 30, thereby improving the energy conversion efficiency and preventing light scattering caused by the roughness of the substrate 12.

Preferably, the blocking layer 15 is made of a material that has a sufficient blocking capability without adversely affecting the performance of the dye-sensitized solar cell. More preferably, the blocking layer 15 may contain at least one metal oxide selected from the group consisting of titanium (Ti) oxide, zirconium (Zr) oxide, strontium (Sr) oxide, zinc (Zn) oxide, indium (In) oxide, lanthanum (La) oxide, vanadium (V) oxide, molybdenum (Mo) oxide, tungsten (W) oxide, tin (Sn) oxide, niobium (Nb) oxide, magnesium (Mg) oxide, aluminum (Al) oxide, yttrium (Y) oxide, scandium (Sc) oxide, samarium (Sm) oxide, gallium (Ga) oxide, strontium-titanium (SrTi) oxide, and a mixture thereof.

The thickness of the blocking layer 15 may be determined based on its ability to block the electron-transfer between the substrate and the electrolyte and the extent of improvement in the blocking. Preferably, the blocking layer 15 has an average thickness ranging from 1 to 5,000 nm.

Further, in accordance with another aspect of the present invention, there is provided a process for preparing a photo-electrode for a dye-sensitized solar cell comprising (a) preparing a conductive substrate; (b) forming a meso-porous thin film on the surface of the conductive substrate; (c) forming a porous film comprising metal oxide nanoparticles on the meso-porous thin film; and (d) making a photosensitive dye to adsorb on the surface of the porous film.

In step (a), a conductive substrate 12 suitable for a photo-electrode is provided. The conductive substrate 12 may be selected among those available in the art as described earlier.

In step (b), a meso-porous metal oxide thin film 13 is formed on the conductive substrate 12. For this, an alcoholic sol-gel solution containing a metal oxide precursor, a surfactant and hydrochloric acid is prepared, the solution is coated on the conductive substrate, and the coat is heat-treated, to form the meso-porous thin film, wherein the metal oxide precursor may be a titanium alkoxide.

First, a surfactant is completely dissolved in an alcoholic solvent, which is then mixed with a solution comprising a titanium alkoxide, hydrochloric acid and an alcohol, followed by stirring the resulting mixture at room temperature for 3 hours to obtain a metal oxide precursor solution, which is an alcoholic sol-gel solution comprising titanium alkoxide, for forming the meso-porous metal oxide thin film. The titanium alkoxide may be any one selected from the group consisting of titanium ethoxide, titanium butoxide and titanium isopropoxide.

The metal oxide precursor solution is coated on the first conductive substrate 12 at a rate of 1,500 to 3,000 revolutions per minute (rpm) for 20 to 60 seconds. In this case, the coating may be conducted by spin coating, dip coating, or drop casting, preferably by spin coating. Since humidity changes during the coating may hinder the control of the formation of the meso-porous metal oxide thin film, it is preferable to carry out the coating under a nitrogen atmosphere. Also, it is preferred that the coated substrate is stored and aged for 5 days in a constant temperature and humidity chamber maintained at 25° C. and 70% relative humidity. If the temperature and the relative humidity are not maintained properly, the meso-porous metal oxide thin film may not firmly adhere to the first conductive substrate. In this case, the thin film is not transparent, and even a slight physical impact may cause the thin film to detach from the substrate.

The meso-porous metal oxide thin film aged for 5 days may then be subjected to heat treatment at 300 to 550° C., more preferably 300 to 500° C. and most preferably 350° C. Although a longer period of the heat treatment may produce a well aligned meso-porous metal oxide thin film, it may damage the first conductive substrate resulting in significantly increased impedance. Accordingly, it is preferred that the heat treatment is carried out over a period of 10 minutes to 2 hours and more preferably 1 to 2 hours. Further, if the meso-porous metal oxide thin film kept at the high treatment temperature is cooled too rapidly, it may adversely affect the adhesion between the substrate and the meso-porous metal oxide thin film. Thus, the heat treated thin film should be cooled slowly from the treatment temperature to room temperature over a period of 4 to 5 hours.

In step (c), a porous film 14 comprising metal oxide nanoparticles is formed on the meso-porous thin film 13. For this, a paste containing metal oxide nanoparticles, a polymer binder and a solvent is prepared, the paste is coated on the meso-porous thin film, and the coat is heat-treated, to form the porous film.

First, a paste comprising metal oxide nanoparticles, a polymer binder, and a solvent is prepared. The paste is coated on the meso-porous metal oxide thin film, which is subsequently subjected to heat treatment. The metal oxide nanoparticles may be any of the materials described earlier. Any of various polymer binders and solvents commonly available in the art may be used in the present invention. The heat treatment may be conducted at a temperature of 400 to 550° C. for a period of 10 to 120 minutes. The nanoparticulated oxide may comprise a polyethylene glycol (PEG) and may be coated by the doctor blade or screen printing method. Consequently, a nanoparticulated oxide film is formed on the meso-porous metal oxide thin film 13.

In step (d), a photosensitive dye is adsorbed on the surface of the porous film. For this, the substrate having the meso-porous thin film and the porous film formed thereon is immersed in a solution containing a photosensitive dye for a period from 1 to 48 hours, to induce the adsorption of the photosensitive dye on the surface of the porous film.

The photosensitive dye used in the present invention may be ruthenium (Ru) or a composite thereof which is capable of absorbing visible light. Any of various photosensitive dyes commonly available in the art may be used in the present invention.

Any of the methods used for adsorbing dye employed in the preparation of dye-sensitized solar cells may be used in the present invention. Preferably, the substrate having the meso-porous metal oxide thin film and the porous film formed thereon is immersed in a solution containing a photosensitive dye for a period of 1 to 48 hours, preferably 12 hours, to allow the photosensitive dye to adsorb on the surface of the porous film. The solvent for dissolving the dye is not particularly limited in the present invention but is preferably acetonitrile, dichloromethane, or an alcohol. After the adsorption of the dye, the substrate may be washed with a solvent to remove unadsorbed dye.

The present invention may further comprise the step of forming a blocking layer between steps (a) and (b). This step may be performed by masking an area roughly equal in size with the surface of the meso-porous metal oxide thin film formed on the conductive substrate, coating a composition comprising a blocking layer component on the meso-porous metal oxide thin film, and heat treating. The composition comprising a blocking layer component may be a metal oxide precursor solution comprising a metal oxide precursor and an organic solvent.

The metal oxide precursor that may be employed in forming the blocking layer is any material that can form, by way of heat treatment, at least one selected from the group consisting of titanium (Ti) oxide, zirconium (Zr) oxide, strontium (Sr) oxide, zinc (Zn) oxide, indium (In) oxide, lanthanum (La) oxide, vanadium (V) oxide, molybdenum (Mo) oxide, tungsten (W) oxide, tin (Sn) oxide, niobium (Nb) oxide, magnesium (Mg) oxide, aluminum (Al) oxide, yttrium (Y) oxide, scandium (Sc) oxide, samarium (Sm) oxide, gallium (Ga) oxide, and strontium-titanium (SrTi) oxide, the metal oxide precursor has preferably titanium (IV) chloride, titanium (IV) isopropoxide, titanium (IV) bis(ethylacetoacetato) diisopropoxide, and a mixture thereof.

The organic solvent that may be used in preparing the metal oxide precursor solution is methyl alcohol, ethyl alcohol, tetrahydrofuran, distillation water, or a mixture thereof.

The metal oxide precursor solution preferably contains 0.5 to 25 parts by weight of the metal oxide precursor per 100 parts by weight of the solvent. The concentration of the metal oxide precursor solution is preferably in the range of 0.01 to 0.5 M. The concentration is maintained not less than 0.01 M for securing a minimum photoelectric current density and not more than 0.5 M due to the increase in the photoelectric current density.

The metal oxide precursor solution may be applied on the conductive substrate by, e.g., spin coating, dip coating and drop casting, preferably by spin coating. Subsequently, the coated substrate thus obtained is subjected to heat treatment at a temperature of 400 to 550° C. for a period of 10 to 120 minutes to form the blocking layer, wherein the blocking layer preferably has a thickness of 1 to 5,000 nm.

Subsequent to the formation of the blocking layer, a porous film is formed according to the method as described earlier to obtain the photo-electrode shown in FIG. 1B.

Further, in accordance with another aspect of the present invention, there is provided a photosensitized solar cell comprising the photo-electrode; a counter electrode disposed opposite to the photo-electrode; and an electrolyte filled between the electrodes.

Figure 2:
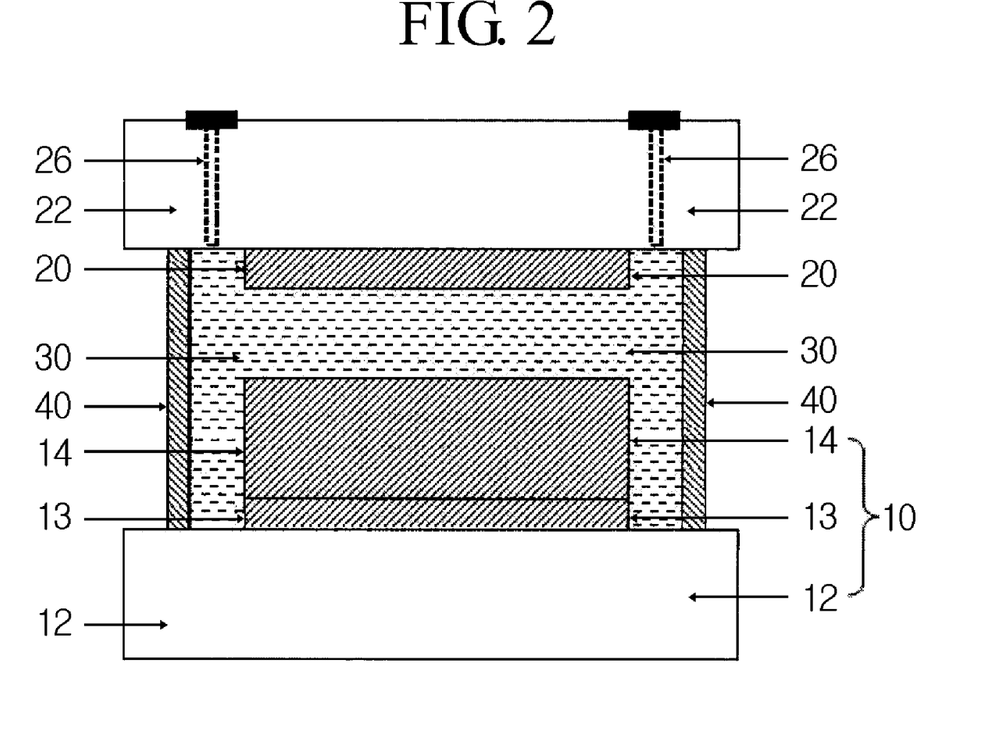
FIG. 2: a schematic view of a dye-sensitized solar cell comprising the inventive photo-electrode in accordance with another embodiment of the invention.

FIG. 2 shows a schematic structural view of a dye-sensitized solar cell in accordance with another embodiment of the invention.

The dye-sensitized solar cell according to the present invention comprises a photo-electrode 10, which comprises a conductive substrate 12, a meso-porous metal oxide thin film 13, and a porous film 14 formed on the substrate in order. The counter electrode 20 and the electrolyte 30 may be of any kind that is available in the art, and the method of preparing the same is not limited in the present invention.

For example, the counter electrode 20 may comprise a platinum layer or a carbonaceous layer on a second conductive substrate 22, or may use the same material as that of the first conductive substrate described earlier.

The electrolyte 30 typically may be an iodide-based oxidation and reduction electrolyte such as a solution of iodide dissolved in acetonitrile. The electrolyte should have a hole transportation property. For example, the electrolyte receives electrons from the counter electrode and transfers electrons to the dye by reduction and oxidation using iodide/triodide, wherein the open circuit voltage is determined by the energy level difference between the dye and the redox potential of the electrolyte. The electrolyte is uniformly dispersed between the photo-electrode and the counter electrode, and may be permeated into the metal oxide nanoparticles.

An exemplary method of preparing the dye-sensitized solar cell according to the present invention is described below.

As depicted in FIGS. 1A to 2, a first conductive substrate 12 having a transparency of 80% and coated with FTO or ITO is provided, on which a meso-porous metal oxide thin film 13 and a porous metal oxide film 14 are formed in order.

Then, the first conductive substrate 12 having the meso-porous metal oxide thin film and the nanoparticle oxides coated thereon is immersed in a photosensitive dye such as a rubidium (Ru) based dye solution, to allow the photosensitive dye to adsorb on the surface of the porous film, resulting in a photo-electrode 10 which is used as an anodic semiconductor electrode.

Then, a counter electrode 20 which is used as a cathode and the photo-electrode 10 which is used as an anode obtained as above are assembled. In this embodiment, the counter electrode is positioned opposite to the photo-electrode so that they face each other. A polymeric adhesive layer 40 made of Surlyn™ (commercially available from Du Pont Co.) having a thickness of about 30 to 60 μm is positioned between the counter electrode and the photo-electrode, and then the two electrodes are compressed under a high temperature and high pressure condition. The polymeric adhesive layer 40 is firmly attached to the surfaces of the two electrodes by heat and applied force.

Finally, the electrolytic solution 30 is filled in the space between the two electrodes through fine holes formed in the second conductive substrate. When the space is completely filled with the electrolytic solution, the fine holes are sealed with, e.g., a conductive transparent tape, to complete the fabrication of the dye-sensitized solar cell.

The following Examples and Comparative Examples are given for the purpose of illustration only, and are not intended to limit the scope of the invention.

Example 1

Production of Photo-Electrode 1.174 g of a surfactant (F127) was dissolved in 11.6 ml of ethanol with stirring. A solution obtained by dissolving 6 ml of titanium isopropoxide (TTiP) in 6 ml of ethanol was added slowly over a period of 3 hours to the surfactant solution with stirring to produce a sol-gel solution.

The sol-gel solution obtained above was spin coated over a glass substrate having a fluorine-doped tin oxide (FTO) coat under a nitrogen atmosphere at a rate of 2,000 rpm for 20 seconds, which was then aged in a constant temperature and humidity chamber maintained at 20° C. and 70% relative humidity for 5 days. The aged meso-porous layer was heat-treated by elevating the temperature to 350° C. at a rate of 5° C. per minute, and then, maintaining at 350° C. for 15 minutes to form a meso-porous titanium oxide thin film.

A metal oxide nanoparticle paste was prepared using titanium oxide nanoparticles having an average particle diameter of 20 nm, a polymer binder (ethyl cellulose) and an organic solvent (Terpineol). Then, the paste was applied over the meso-porous titanium oxide thin film with a doctor blade, and the coated substrate thus obtained was subjected to heat treatment at 500° C. for 15 minutes to convert the paste layer to a porous film comprising metal oxide nanoparticles.

The coated substrate thus obtained was immersed in 0.3 mM ethanol solution of a photosensitive dye [Ru(4,4'-dicarboxy-2,2'-bipyridine)$_2$(NCS)$_2$] for 12 hours, to allow the photosensitive dye to adsorb on the surface of the porous film, to produce a photo-electrode.

Production of Counter Electrode

A glass substrate having an FTO coat was prepared. An area of 1.5 cm$^2$ of the substrate surface was isolated by masking with an adhesive tape, and a solution of H$_2$PtCl$_6$ was coated thereon with a spin coater. After the adhesive tape was removed, the substrate was subjected to heat treatment at 500° C. for 30 minutes to produce a counter electrode.

Injection of Electrolyte and Sealing

An acetonitrile electrolyte containing LiI (0.5 M) and I (0.05 M) was injected into the space between the photo-electrode and the counter electrode prepared as above and sealed to obtain a dye-sensitized solar cell.

Example 2

The procedure of Example 1 was repeated except that 0.05 M solution of titanium (IV) bis(ethylacetoacetato) diisopropoxide (solvent: ethyl alcohol) was further spin coated over the meso-porous titanium oxide thin film obtained in Example 1 at a rate of 2,000 rpm, and then, heat-treated at 500° C. for 20 minutes, to form a blocking layer.

Comparative Example 1

The procedure of Example 1 was repeated except that the meso-porous titanium oxide thin film was not formed during the production of a photo-electrode.

Comparative Example 2

The procedure of Example 2 was repeated except that the meso-porous titanium oxide thin film was not formed during the production of a photo-electrode.

Test Example 1

Figure 3:
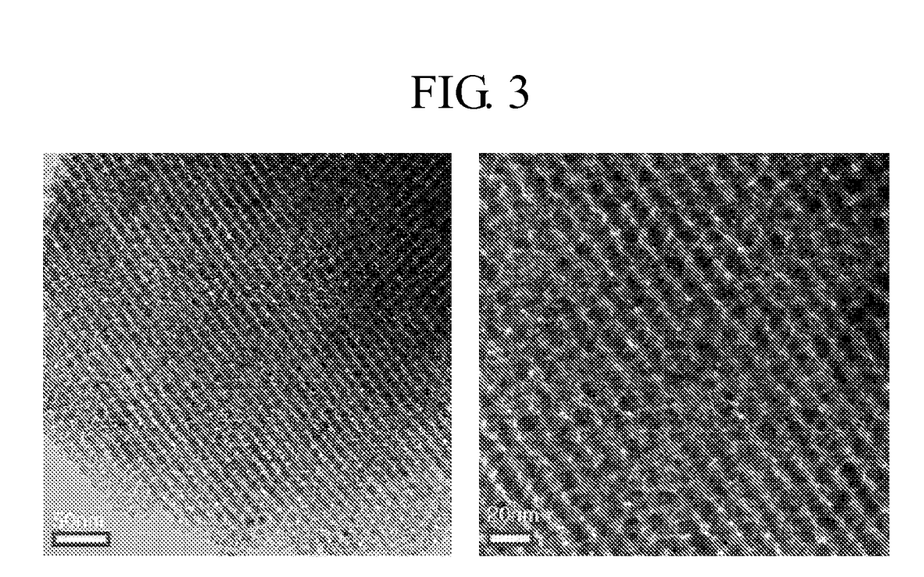
FIG. 3: a transmission electron microscopic (TEM) image of the surface of the meso-porous metal oxide thin film in accordance with Example 1.
Figure 4:
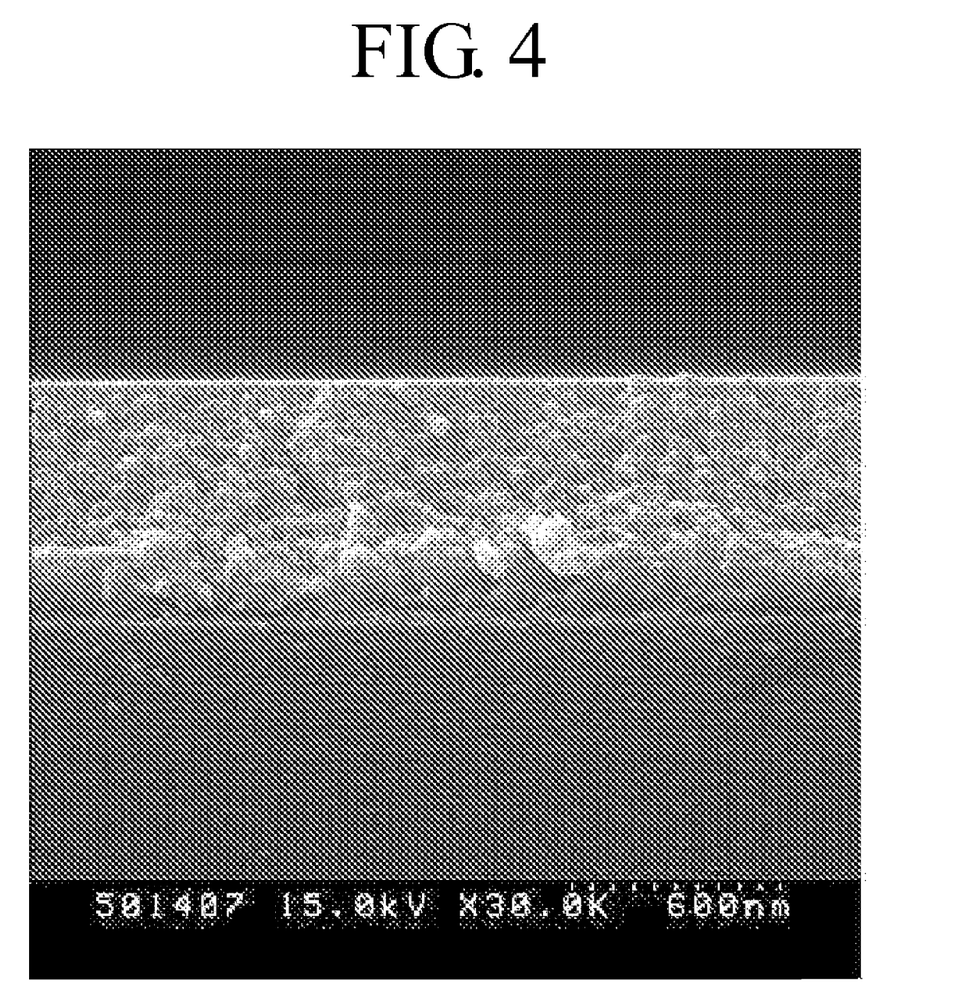
FIG. 4: a scanning electron microscopic (SEM) image of the side of the meso-porous metal oxide thin film in accordance with Example 1.

The surface of the meso-porous titanium oxide thin film obtained in Example 1 was observed with a transmission electron microscope (TEM), and the side thereof, with a scanning electron microscope (SEM). The results are shown in FIGS. 3 and 4, respectively.

Test Example 2

The light transmittance of the substrate on which the meso-porous titanium oxide thin film was formed as in Examples 1 and 2 was compared with that of the substrate on which the meso-porous titanium oxide thin film was not formed as in Comparative Examples 1 and 2. The results are shown in FIG. 5.

Figure 5:
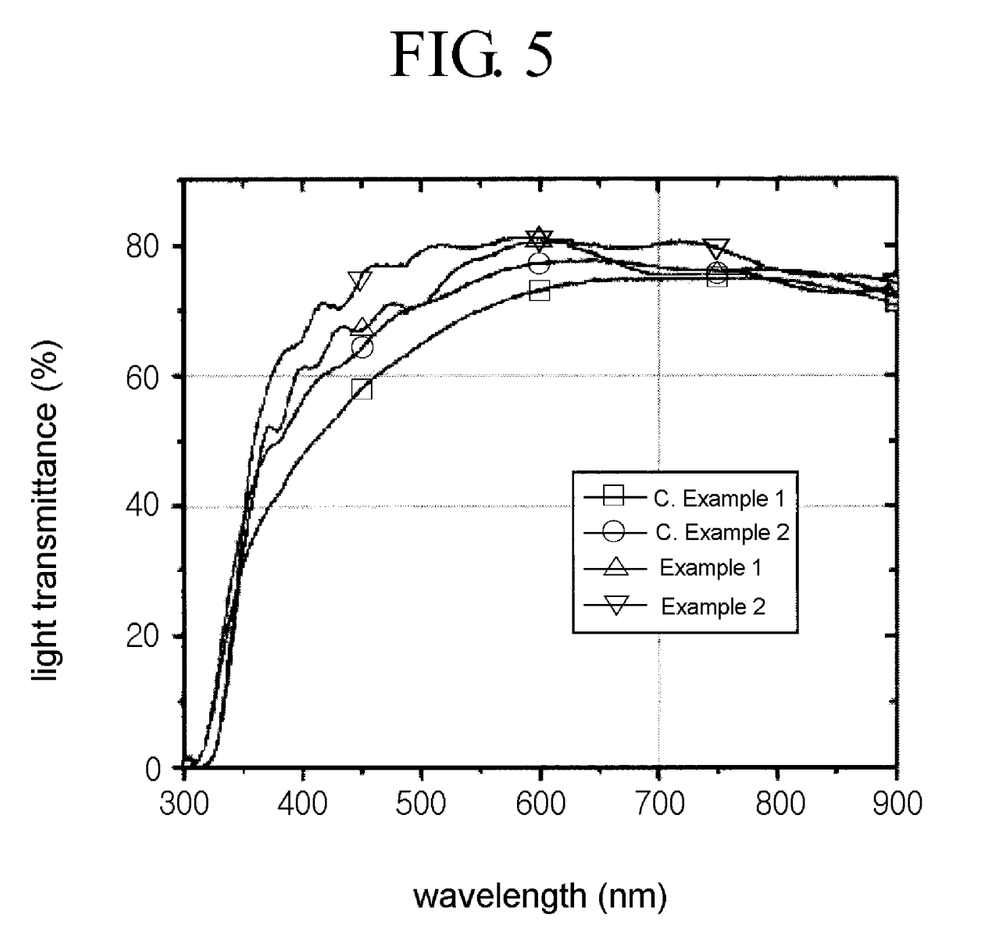
FIG. 5: light transmittance spectra obtained with the dye-sensitized solar cells of Examples 1 and 2, and Comparative Examples 1 and 2.

As shown in FIG. 5, the films obtained in Examples 1 and 2 exhibit higher degrees of light transmittance than the films obtained in Comparative Examples 1 and 2.

Test Example 3

The open circuit voltage, photocurrent density, energy conversion efficiency and fill factor of each of the dye-sensitized solar cells obtained in Examples 1 and 2 and Comparative Examples 1 and 2 were measured as described below. The results are shown in Table 1 below.

(1) Open Circuit Voltage (V) and Photocurrent Density (mA/cm$^2$)

The open circuit voltage and photocurrent density were measured using Keithley SMU2400.

(2) Energy Conversion Efficiency and Fill Factor (%)

The energy conversion efficiency was measured using 1.5 AM, 100 mW/cm$^2$ solar simulator equipped with a xenon lamp (300 W, Oriel), AM 1.5 filter, and Keithley SMU2400; and the fill factor was calculated from the energy conversion efficiency using the following equation:

$$\text{Fill Factor}(\%) = \frac{(J \times V)_{max}}{J_{SC} \times V_{OC}} \times 100$$

wherein J and V denote Y- and X-axis values of an energy conversion efficiency curve, respectively, and $J_{SC}$ and $V_{OC}$ denote Y- and X-axis intercept values, respectively.

The current-voltage characteristics were evaluated using a 100 mW/cm$^2$ xenon lamp as a light source for each dye-sensitized solar cell.

TABLE 1

|  | Open voltage (g) | Photocurrent density (mA/cm$^2$) | Fill factor (%) | Energy conversion efficiency (%) |
|---|---|---|---|---|
| Example 1 | 0.758 | 15.2 | 69.9 | 8.05 |
| Example 2 | 0.767 | 15.2 | 70.2 | 8.19 |
| Comparative Example 1 | 0.718 | 14.5 | 66.7 | 6.96 |
| Comparative Example 2 | 0.753 | 14.5 | 69.3 | 7.59 |

As shown in Table 1, the dye-sensitized solar cells obtained in Examples 1 and 2 exhibit higher efficiencies than those obtained in Comparative Examples 1 and 2. The above results suggest that the existence of the thin buffer layer, i.e., the meso-porous metal oxide thin film employed in the dye-sensitized solar cells according to the present invention exhibits much improved properties in terms of light transmittance and the adhesion between the semiconducting nanoparticulated oxide and the substrate, as compared with the conventional solar cells.

As discussed above, the meso-porous titanium oxide thin film acting as a blocking layer and exhibiting an improved light transmittance is employed for use as a buffer material in the photo-electrode, which renders the conductive substrate more transparent and improves the adhesion between the substrate and the porous film, thereby enhancing the photoelectric conversion efficiency. Further, the meso-porous titanium oxide thin film prepared according to the present invention may be advantageously applied to the development of electronic paper exhibiting vivid colors.

While the embodiments of the subject invention have been described and illustrated, it is obvious that various changes and modifications can be made therein without departing from the spirit of the present invention which should be limited only by the scope of the appended claims.

What is claimed is:

1. A photo-electrode for a dye-sensitized solar cell comprising:
    a conductive substrate;
    a meso-porous metal oxide thin film formed on the surface of the conductive substrate;
    a blocking layer formed on the meso-porous oxide thin film;
    a porous film formed on the blocking layer and comprising metal oxide nanoparticles; and
    a photosensitive dye adsorbed on the surface of the porous film.

2. The photo-electrode of claim 1, wherein the metal oxide of the meso-porous metal oxide thin film or the porous film is selected from the group consisting of titanium (Ti) oxide, zirconium (Zr) oxide, strontium (Sr) oxide, zinc (Zn) oxide, indium (In) oxide, lanthanum (La) oxide, vanadium (V) oxide, molybdenum (Mo) oxide, tungsten (W) oxide, tin (Sn) oxide, niobium (Nb) oxide, magnesium (Mg) oxide, aluminum (Al) oxide, yttrium (Y) oxide, scandium (Sc) oxide, samarium (Sm) oxide, gallium (Ga) oxide, strontium-titanium (SrTi) oxide, and a mixture thereof.

3. The photo-electrode of claim 1, wherein the meso-porous metal oxide thin film has an average thickness of 5,000 nm or less.

4. The photo-electrode of claim 1, wherein the porous film has an average thickness of 10 to 20 μm.

5. The photo-electrode of claim 1, wherein the porous film has metal oxide nanoparticles having an average particle diameter of 1 to 500 nm.

6. The photo-electrode of claim 1, wherein the blocking layer has an average thickness of 5,000 nm or less formed on the meso-porous metal oxide thin film.

7. A process for preparing a photo-electrode for a dye-sensitized solar cell comprising:
    (a) preparing a conductive substrate;
    (b) forming a meso-porous thin film comprising metal oxides on the surface of the conductive substrate;
    (c) forming a blocking layer on the meso-porous oxide thin film;
    (d) forming a porous film comprising metal oxide nanoparticles on the blocking layer; and
    (e) making a photosensitive dye to adsorb on the surface of the porous film.

8. The process of claim 7, wherein step (b) comprises preparing an alcoholic sol-gel solution containing a metal oxide precursor, a surfactant and hydrochloric acid, coating the solution on the conductive substrate, and heat-treating the resulting coating, to form the meso-porous thin film, wherein the metal oxide precursor is a titanium alkoxide.

9. The process of claim 8, wherein the titanium alkoxide is selected from the group consisting of titanium ethoxide, titanium butoxide, titanium isopropoxide, and a mixture thereof.

10. The process of claim 8, wherein the coating is conducted by spin coating, dip coating, or drop casting.

11. The process of claim 8, wherein the heat treatment is conducted at a temperature of 300 to 550° C. for a period from 10 minutes to 2 hours.

12. The process of claim 7, wherein step (d) comprises preparing a paste containing metal oxide nanoparticles, a polymer binder, and a solvent, coating the paste on the meso-porous thin film, and heat-treating the resulting coating, to form the porous film.

13. The process of claim 12, wherein the heat treatment is conducted at a temperature of 400 to 550° C. for a period from 10 to 120 minutes.

14. The process of claim 7, wherein step (e) comprises immersing the substrate having the meso-porous thin film and the porous film formed thereon in a solution containing a photosensitive dye for a period of 1 to 48 hours, to allow the photosensitive dye to adsorb on the surface of the porous film.

15. The process of claim 7, wherein the metal oxide of the meso-porous metal oxide thin film or the porous film is selected from the group consisting of titanium (Ti) oxide, zirconium (Zr) oxide, strontium (Sr) oxide, zinc (Zn) oxide, indium (In) oxide, lanthanum (La) oxide, vanadium (V) oxide, molybdenum (Mo) oxide, tungsten (W) oxide, tin (Sn) oxide, niobium (Nb) oxide, magnesium (Mg) oxide, aluminum (Al) oxide, yttrium (Y) oxide, scandium (Sc) oxide, samarium (Sm) oxide, gallium (Ga) oxide, strontium-titanium (SrTi) oxide, and a mixture thereof.

16. The process of claim 7, wherein step (c) comprises coating a metal oxide precursor solution on the meso-porous metal oxide thin film and heat treating the coating to form a blocking layer.

17. The process of claim 16, wherein the metal oxide precursor solution is obtained by dissolving 0.5 to 25 parts by weight of a metal oxide precursor in 100 parts by weight of a solvent, wherein the solvent is selected from the group consisting of methyl alcohol, ethyl alcohol, tetrahydrofuran, distilled water, and a mixture thereof; the metal oxide precursor is selected from the group consisting of titanium (IV) chloride, titanium (IV) isopropoxide, and titanium (IV) bis(ethylacetoacetato) diisopropoxide; and the concentration of the metal oxide precursor solution is in the range of 0.01 to 0.5 M.

18. A dye-sensitized solar cell comprising:
a photo-electrode in accordance with claim 1;
a counter electrode disposed opposite to the photo-electrode; and
an electrolyte filled between the photo-electrode and the counter electrode.

19. A dye-sensitized solar cell comprising:
a photo-electrode prepared by the method of claim 7;
a counter electrode disposed opposite to the photo-electrode; and
an electrolyte filled between the photo-electrode and the counter electrode.

* * * * *